June 24, 1930. F. C. THOMPSON 1,766,415
GEAR TRANSMISSION
Original Filed Jan. 23, 1926
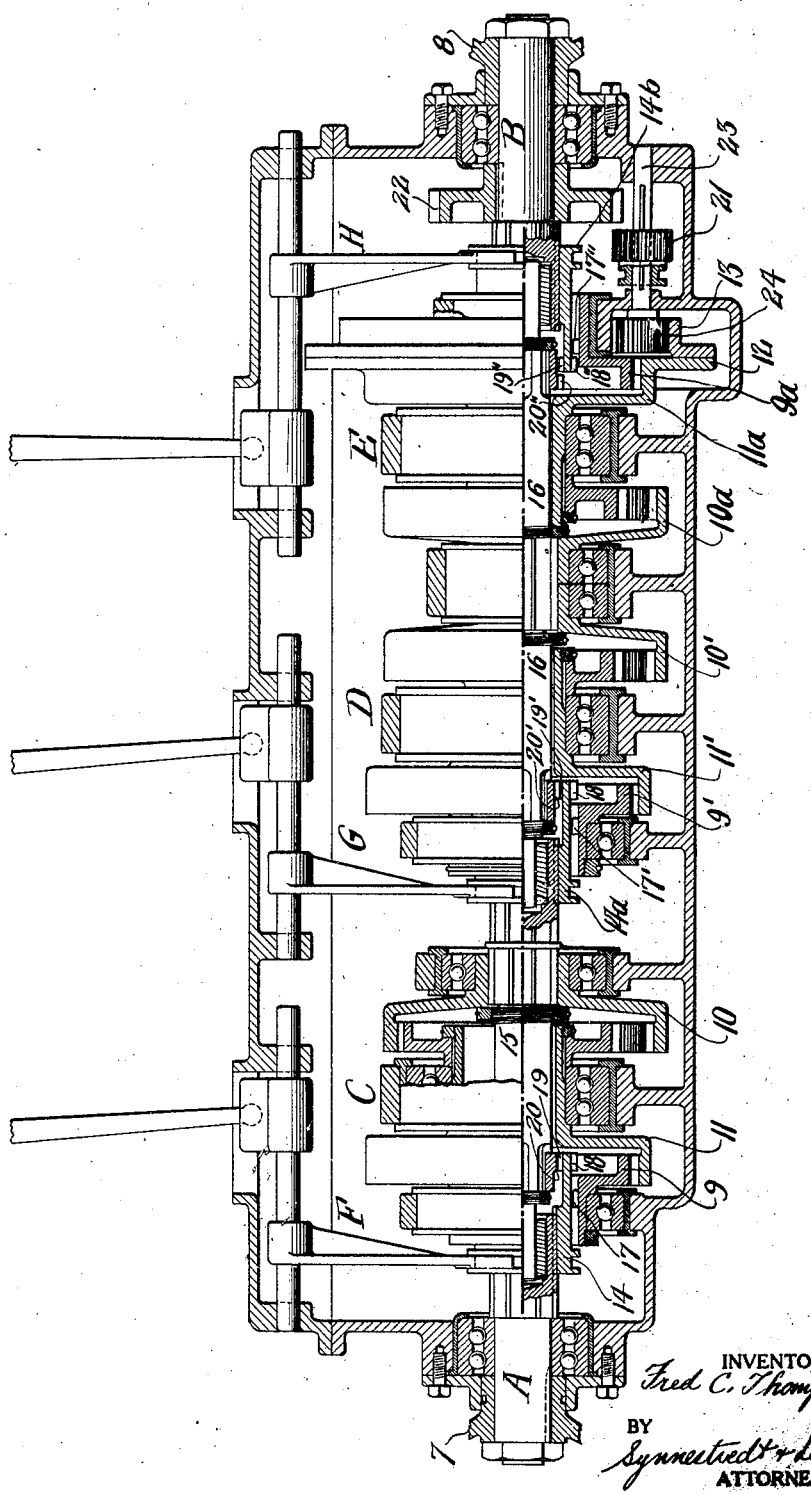
INVENTOR
Fred C. Thompson
BY
Synnestvedt & Lechner
ATTORNEYS Patented June 24, 1930

1,766,415

UNITED STATES PATENT OFFICE

FRED C. THOMPSON, OF DETROIT, MICHIGAN, ASSIGNOR TO MORSE CHAIN COMPANY, OF ITHACA, NEW YORK, A CORPORATION OF NEW YORK

GEAR TRANSMISSION

Application filed January 23, 1926, Serial No. 83,183. Renewed September 28, 1929.

This invention relates to gear transmissions and is particularly useful in connection with automotive vehicles, especially large vehicles such as buses.

One of the primary objects of my invention is the provision of a simple, compact, quiet and effective gear transmission having a wide range of speed changes as between the driving element and the driven element thereof.

Another object of the invention is the provision of a device of the character described in which the drive and driven members thereof may be connected for speed reduction, direct speed and for overspeed.

A more specific object of the invention is the provision of a device of this character built up of a plurality of substantially counterpart units.

A further object of the invention is the provision of a gear transmission employing balanced internal and external gearing.

How the foregoing, together with such other objects as may hereinafter appear, or are incident to my invention, I obtain by means of a construction which I have illustrated in preferred form in the accompanying drawings wherein:

The figure is a longitudinal section through a transmission constructed in accordance with my invention, and in which the upper half of the units employed are shown in elevation, as well as certain of the other parts of the device.

In the drawing I have shown an arrangement suitable for use in connection with an automotive vehicle, although it is to be understood that my invention is useful in other types of machinery.

In the particular embodiment shown the reference letter A denotes the drive shaft of the device connectible in any suitable manner to the motor of the vehicle as by means of the member 7, and the reference letter B denotes the driven shaft connectible in any suitable manner to the driven element of the vehicle as by means of the member 8, said shafts being aligned.

Between the shafts A and B and connectible therewith are a plurality of gear units, in this instance three being shown, C, D and E, for the transmission of power from the drive shaft to the driven shaft in various speed ratios as will further appear. The units C, D and E have associated therewith the control means F, G and H, respectively, through the manipulation of which the units and shafts may be connected in various combinations to obtain changes in speed.

Referring more particularly to the first unit C, it will be seen that it comprises an external driving gear 9, an internal driven gear 10 and an intermediate compound gear 11 mounted on an axis offset from the axis of the shafts A and B. The compound gear 11 comprises an internal gear meshing with the driving gear 9, an external gear meshing with the internal gear 10 and a hollow shaft portion connecting said internal and external gears. In this connection it is pointed out that the compound gear 11 is rotatably mounted in a fixed bearing, the axis of which is offset from the axis of the drive and driven shafts and the general axis of the gear units. This is very advantageous in a multiple unit transmission in which it is important that the balance of the units be maintained. By an arrangement of gears as above described, all the gears rotate on fixed axes, so that no whipping or unbalancing forces exist. The second unit D is similar in construction to unit C, the corresponding gears being designated by numerals 9′, 10′ and 11′.

The third unit E is of substantially the same construction as the units C and D, it being mounted, however, in a reversed position, so that its internal gear 10$^a$ is a driving gear and its external gear 9$^a$ is a driven gear. The compound gear 11$^a$ of this unit is shown provided with a flange 12 for securing thereto the internal gear 13 of the reversing gears to be hereinafter described.

The driving gear 9 of the first unit C may be connected to and disconnected from the drive shaft A by operating the clutch member 14 of the control means F which is splined on the shaft A and when moved to the left connects said gear with said drive shaft to transmit the drive from the shaft A through the gears 9, 11 and 10 to the driven shaft 15 of this first unit. The driven gear 10 is keyed to the shaft 15.

The driving gear 9′ of the second unit D may be connected to and disconnected from the shaft 15 by operating the clutch member 14ᵃ of the control means G which is splined on the shaft 15 and when moved to the left connects said gear with the shaft 15 to transmit the drive from this shaft through the gears 9′, 11′ and 10′ to the driven shaft 16 of this second unit. The driven gear 10′ of this unit is keyed to the shaft 16. It will thus be seen that the driven shaft 15 of the unit C is the drive shaft of the unit D.

The driving gear 10ᵃ of the third unit E is keyed to the driven shaft 16 of the unit D so that the drive may be transmitted from the shaft 16 through the gears of this unit to the driven shaft B by throwing the clutch member 14ᵇ of the control means H to the right, said clutch member 14ᵇ being splined to the driven shaft B. It is pointed out that the gears 9, 9′ and 9ᵃ are provided with projections or teeth 17, 17′ and 17″ engageable by the projections or teeth 18, 18′ and 18″ on the clutch members 14, 14ᵃ and 14ᵇ respectively when they are shifted as above pointed out.

The clutch members are also provided with another set of projections or teeth 19, 19′ and 19″ engageable with the projections or teeth 20, 20′ and 20″ on the shafts 15 and 16 when the members 14 and 14ᵃ are moved to the right and the member 14ᵇ to the left. In this connection it is pointed out that the teeth 17, 17′ and 17″ and 20, 20′ and 20″ are so spaced with respect to one another that a neutral position of the clutch collar may be found between them.

From the above it will be seen that the shafts A, 15, 16 and B are coaxial and that the general axis of the units C, D and E coincides with the axis of the shafts, so that a very compact arrangement is afforded.

By the employment of internal gears greater tooth contact is afforded over the usual spur gearing employed in transmissions and a quiet running transmission results.

In the particular arrangement shown, four speeds forward and one reverse may be obtained, the forward speeds being a low speed having a double reduction through two units, a second speed having a single reduction through one unit, a direct speed in which the drive and driven shafts rotate at the same speed and an overspeed through one unit in which the driven shaft rotates faster than the drive shaft.

The operation of the device is as follows:

In order to obtain first or low speed the control means F, G and H are all moved to the left which effects a drive from the drive shaft A thru the gears of units C and D to the driven shaft 16 of the unit D and to the driven shaft B of the transmission by virtue of its direct connection to the shaft 16. With the parts in this position the gears of the unit E run idle. Thus a low speed is obtained having a ratio equal to the reduction of the combined units C and D.

In order to obtain second speed the control means F and H are left in the above position and the control means G is moved to the right which effects a drive through the gears of the first unit C and the directly coupled shafts 15 and 16 to the driven shaft B. With the parts in this position the gears of the units D and E run idle.

For direct or third speed the control means G and H are left in the second speed position and the control means F is moved to the right whereby all the shafts are directly connected together, the gears of the units running idle.

For overspeed the control means F and G are left in the direct speed position and the control means H is moved to the right whereby the shafts A, 15 and 16 are directly connected and the driven shaft B is connected therewith through the medium of the gears of the unit E.

For reverse the control means F, and G are moved to the positions described in connection with low speed and the control means H is moved to its neutral position, which is the position shown in the drawing, and the sliding gear 21 of the reversing gears is meshed with the gear 22 which is keyed to the driven shaft B, thus causing the shaft B to rotate in a reverse direction. The gear 21 is splined on the idler shaft 23 which shaft carries the gear 24 meshing with the internal gear 13 previously mentioned.

While I have described my invention as composed of two reducing units and one overspeed unit, it is to be understood that any number of units may be employed in accordance with the service to which the device is to be put.

In the drawing the control means F and G are in direct drive position and the control means H is in its neutral position, so that the shafts A and B are disconnected and the device is in neutral. It is obvious that by moving any control means to neutral position the device is placed in neutral.

No specific claim is made herein to the construction of the units C, D and E per se, as claims directed thereto are part of the subject matter of my copending application, Serial No. 731,715, filed August 13, 1924.

I claim:—

1. A gear transmission comprising, in combination, a drive shaft; a driven shaft; and a plurality of gear units each comprising a driving gear and a coaxial driven gear one being external and the other being internal, and a compound gear for connecting said gears the axis of which is fixedly offset from the axis of the driving and driven gears; shafts drivingly related with the driven and driving gears of adjacent units; a clutch having a position for connecting the drive shaft directly with the shaft of a unit and a position for connecting the drive shaft with the driving gear of said unit; a second clutch having a position for connecting the shaft of said unit with the driving gear of another unit and a position for connecting said shaft directly with the shaft of said last mentioned unit; and a third clutch having a position for connecting said last mentioned shaft directly with the driven shaft and a position for connecting the driven gear of another unit with said driven shaft.

2. A gear transmission comprising, in combination, a drive shaft; a driven shaft; and a plurality of gear units each comprising a driving gear and a coaxial driven gear one being external and the other being internal, and a compound gear for connecting said gears the axis of which is fixedly offset from the axis of the driving and driven gears; shafts drivingly related with the driven and driving gears of adjacent units; and a plurality of clutches having positions for directly connecting the drive shaft with a unit shaft, for directly connecting the unit shafts, and for directly connecting a unit shaft with the driven shaft and having positions for connecting the drive shaft with the driving gear of a unit, for connecting a unit shaft with the driving gear of another unit and for connecting the driving gear of still another unit with the driven shaft.

3. In a gear transmission, the combination of a drive shaft; a coaxial driven shaft; a plurality of gear units aligned with said shafts each including a driving gear and a coaxial driven gear one being internal and the other external, a compound gear the axis of which is fixedly offset from the axis of said driving and driven gears for connecting said gears, and shafts drivingly related with the driving and driven gears of adjacent units; and clutch means for each unit having positions for connecting all of said shafts for direct drive from the drive shaft to the driven shaft and having positions for connecting said drive and driven shafts for geared drive.

4. In a gear transmission, the combination of a drive shaft; a coaxial driven shaft; a plurality of gear units aligned with said shafts each including a driving gear and a coaxial driven gear one being internal and the other external, a compound gear the axis of which is fixedly offset from the axis of said driving and driven gears for connecting said gears, and shafts drivingly related with the driving and driven gears of adjacent units; and clutch means for each unit having positions for connecting all of said shafts for direct drive from the drive shaft to the driven shaft and having positions for connecting said drive and driven shafts for geared drive, together with means for moving said clutches independently of one another whereby geared drive of various ratios may be obtained.

5. A gear transmission comprising, in combination, a drive shaft, a driven shaft; and a plurality of gear units each comprising a driving gear and a coaxial driven gear, one being external and the other being internal, and a compound gear for connecting said gears; shafts drivingly related with the driven and driving gears of adjacent units; and a clutch for each gear unit, said clutches having positions for connecting all of said shafts for direct drive from the drive shaft to the driven shaft and having positions for connecting said drive and driven shafts for geared drive of various ratios.

6. A gear transmission comprising, in combination, a drive shaft, a driven shaft; and a plurality of gear units each comprising a driving gear and a coaxial driven gear, one being external and the other being internal, and a compound gear for connecting said gears; shafts drivingly related with the driven and driving gears of adjacent units; and a clutch for each gear unit, said clutches having positions for connecting all of said shafts for direct drive from the drive shaft to the driven shaft and having positions for connecting said drive and driven shafts for geared drive of various ratios; one of said gear units having reversing gearing associated therewith and said driven shaft having a gear mounted thereon with which a gear of said reversing gearing is adapted to be meshed.

In testimony whereof I have hereunto signed my name.

FRED C. THOMPSON.